PROCESS OF MAKING A THERMISTOR
Original Filed Dec. 14, 1962 2 Sheets-Sheet 1
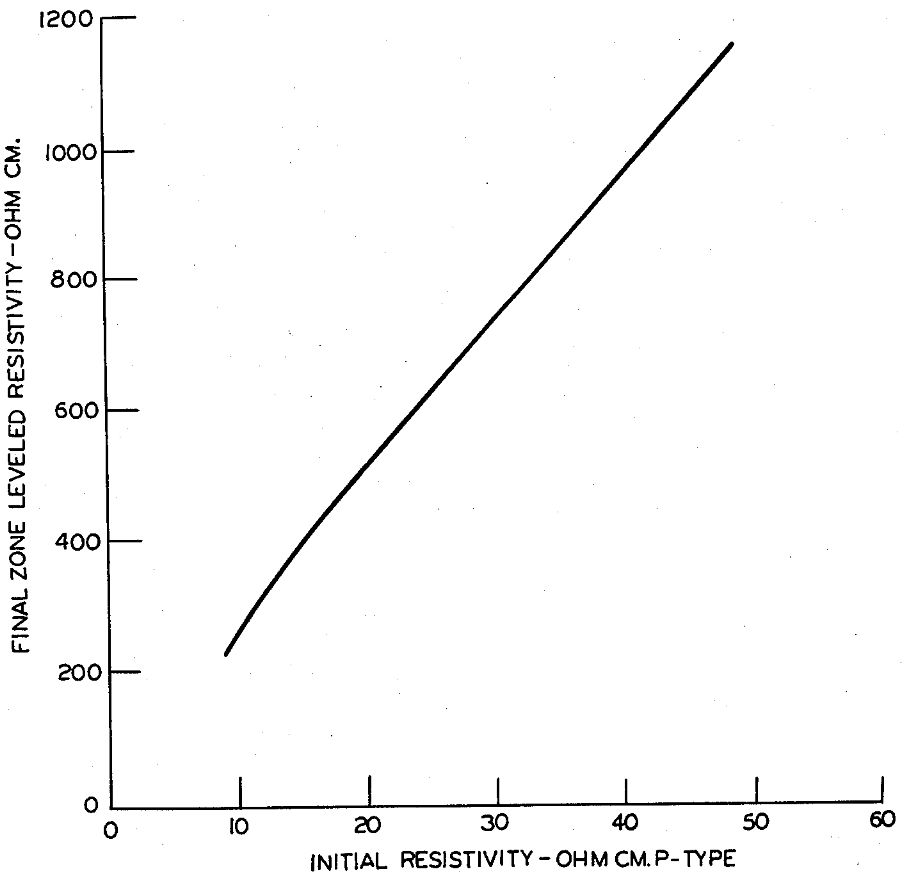
FIG.I
INVENTORS
M.C. VANIK
J.E. HERRERA
M.G. SANCHEZ
BY Joseph P. Nixon
ATTORNEY July 14, 1964 M. C. VANIK ETAL 3,140,531
PROCESS OF MAKING A THERMISTOR
Original Filed Dec. 14, 1962 2 Sheets-Sheet 2
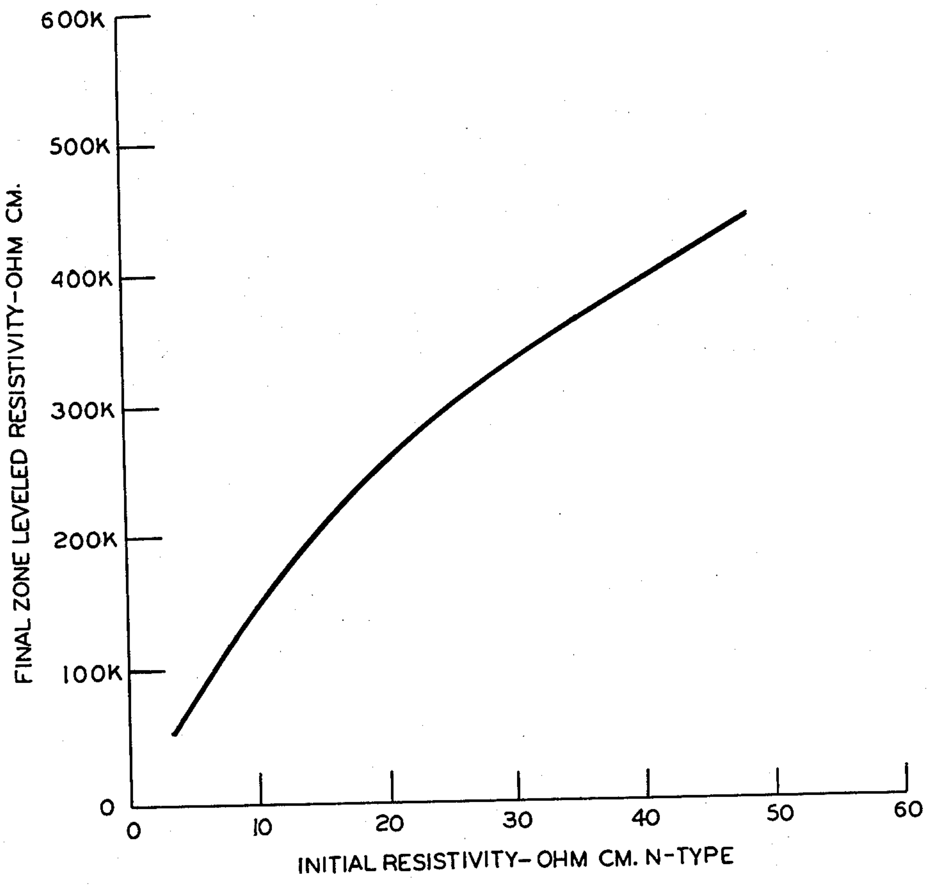
FIG. II
INVENTORS
M.C. VANIK
J.E. HERRERA
M.G. SANCHEZ
BY Joseph P. Nigon
ATTORNEY

3,140,531
PROCESS OF MAKING A THERMISTOR

Milton C. Vanik, Brookville, Moises G. Sanchez, Severna Park, and Jose E. Herrera, Jessup, Md., assignors to W. R. Grace & Co., New York, N.Y., a corporation of Connecticut Continuation of applications Ser. Nos. 244,805 and 244,806, Dec. 14, 1962. This application Feb. 20, 1964, Ser. No. 349,526
10 Claims. (Cl. 29—155.5)

This invention relates to thermistors prepared from single crystals of silicon. More particularly, the invention relates to a process for preparing thermistors from mono-crystalline n-type and p-type silicon which are highly reproducible, predictable and sensitive.

Thermistors are widely used materials that have a negative temperature coefficient of resistance, that is, the electrical resistance decreases as the temperature increases. These materials are characterized by only moderate changes in resistance per degree centigrade. The thermistors in use at the present time are prepared by ceramic techniques from semi-conductor materials usually semiconducting transition metal oxides.

The thermistors of the instant invention exhibit a high degree of precision, reproducibility and sensitivity. They are of value in applications where reliability, reproducibility and sensitivity are prime considerations.

The superior reproducibility of our products stem, in part, from the fact that our raw material is a single crystal of silicon prepared from hyper-pure silicon, an article of commerce which has impurities on the order of parts per billion. This silicon is used in the fabrication of transistors, diodes, rectifiers, etc. The high crystalline perfection found in these single crystals, together with the extreme purity of the silicon, increases the reliability and reproducibility of our materials with respect to other thermistor materials which are poly-crystalline and much less pure.

We have found that thermistors with high reproducibility and reliability can be prepared from semi-conductor materials in a process in which single crystal silicon is doped with gold. The novel feature of our invention resides in the unique manufacturing process.

Very broadly, the process for preparing the p-type devices comprises the folowing steps:

(1) Selection of a suitable monocrystalline silicon material which has the desired resistivity features;

(2) Preparing the selected rod for doping with gold and doping the rod with gold by the zone leveling technique;

(3) Calculating the desired thickness of the production wafers based on the resistivity of trial wafers taken from the gold doped silicon material;

(4) Vacuum depositing aluminum on these wafers followed by alloying the aluminum to the silicon;

(5) Nickel-plating the wafers by the electrodeless technique;

(6) Dicing the wafers and soldering leads to the dice;

(7) Adjusting the size of the thermistors;

(8) Measuring temperature-resistance behavior; and (9) Coating the thermistors with a paint.

Very broadly, the process for preparing the n-type devices comprises the following steps:

(1) Selection of a suitable monocrystalline silicon material which has the desired resistivity features;

(2) Preparing the selected rod for doping with gold and doping the rod with gold by the zone leveling technique;

(3) Calculating the desired thickness of the production wafers based on the resistivity of trial wafers taken from the gold doped n-type silicon material;

(4) Nickel-plating the wafers by the electrodeless technique;

(5) Dicing the wafers and soldering leads to the dice;

(6) Adjusting the size of the thermistors;

(7) Measuring the temperature-resistance behavior; and (8) Coating the thermistors with a paint.

The first step in our process is the selection of a suitable single crystal silicon raw material. The silicon used is an article of commerce. Adequate results can be obtained by using a material with a resistivity variance of ±10 to ±25%. The product with a ±25% resistivity variance is preferred since it gives satisfactory results and is less costly than the material with a resistivity variance of ±10%.

Resistance of a thermistor of constant cross section will follow the equation:

$$R=\rho\frac{L}{A}$$

where $R$=resistance of thermistor in ohms.
$\rho$=resistivity of the thermistor material in ohms/cms.
$L$=length of the thermistor between electrodes in cm.
$A$=the cross sectional area of the thermistor in cm.$^2$.

Since the resistance and approximate size of a desired thermistor is already known, the resistivity of the necessary gold doped silicon can be calculated from the equation. Then, using the relationship shown graphically in FIGURES 1 and 2, the necessary starting silicon resistivity is determined.

The curve shown in FIGURE 1 was determined by experimentally doping various resistivities of p-type silicon with 0.15 gram of high purity gold by the zone leveling technique. The rod diameters were ⅞" to 1" and the estimated weight of the molten zone was 20 grams.

The curve shown in FIGURE 2 was drawn on the values determined by experimentally doping various resistivities of n-type silicon with 0.15 gram of high purity gold by the zone leveling technique. The rod diameters were ⅞" to 1" and the estimated weight of the molten zone was 20 grams.

In the normal commercial operation, the silicon will be purchased from a supplier and the vendor will furnish the silicon within the specifications requested. However, if the silicon is purchased at random, it is advisable to check the silicon resistivity until the resistivity as determined, checks the resistivity given by the vendor.

The next step of the process is the doping of the rod with gold. The gold doping is preferably carried out using the zone leveling technique. This technique is described in the work by Hannay entitled "Semi-Conductors," Rheinhold Pub. Co. (1959), pages 123 and 178 to 180. Briefly, the technique consists of inserting the dope between the seed and the rod (in this case gold) and giving the rod one float zone pass while maintaining singularity of the crystal. This technique is especially useful where the distribution coefficient of the dope is small (usually less than 0.1). A statistical study established that the zone leveling technique gives a more reproducible product than the diffusion technique.

The rod is prepared for zone leveling by a suitable etching process. Any of the conventional etching processes which give satisfactory results may be used. The preferred technique is to etch the rod with a 1 to 3 hydrogen fluoride-nitric acid mixture. This mixture is made up by mixing one volume of (49%) HF with three volumes of concentrated (70%) nitric acid. The etching is carried out until the rod is clean and shiny. It is then rinsed thoroughly in distilled, dionized water of one megohm/cm. or greater resistivity. Droplets of water are removed from the rod by blowing with high-purity argon. The rod is finally dried under an infrared lamp on a thoroughly clean quartz pedestal.

As stated previously, this particular technique is the preferred technique for preparing the rod. Any other suitable etching and cleaning techniques can be substituted for this particular step.

After the rod is thoroughly cleaned, it is doped with a high purity gold using the zone leveling technique. This zone leveling technique is the standard zone-refining procedure in which high-purity gold is used as a dope between the seed and the rod. The gold is melted into the first zone as the seed and the rod are fused together by means of radio-frequency heating. Proper matching of the seed and rod must be made. The resistivity of the seed should be approximately the same as that of the rod. The zone-leveling pass is made at the rate of about 8 inches per hour. If the rod does not go single in the first pass, it should be re-doped before the second pass in order to obtain the same amount of residual gold.

In the next step of the process, a determination of the wafer thickness of the final product is made. The resistivity is measured by cutting three wafers from the seed end, the chuck end and the center of the rod mounted on a ceramic block with jewelers wax. The resistivity of the gold doped silicon after zone leveling is normally so high that the resistivity of the material cannot be checked easily or accurately by any simple 4-point or 2-point probe technique. The resistivity of the rod is checked at the various points mentioned by cutting wafers and fabricating large area devices from them. Because the area of the wafer is large, the resistance of the device will tend to be low, even for the large resistivities of gold doped silicon.

Three wafer-size thermistors are made from the slices. These wafers are aluminum deposited, alloyed, etched and nickel-plated using the techniques described in the subsequent steps. The resistance of the wafers is then measured using a Wheatstone bridge and immersing the wafers in a 25° C.±0.01° C. bath. From the resistance and physical dimensions of the wafers, the resistivity of the silicon is calculated using the equation set out previously.

The thickness of the wafers to be cut is determined on the basis of the resistivity calculated from the trial wafers. After the thickness is calculated from the resistivity measurements and from the dicing tools to be used, the balance of the rod is cut into wafers.

Actually, the thickness of the production wafers is controlled to be about 10% less than that calculated. This means that the resistances of the devices will be about 10% less than the desired value. However, the later size adjustment step will upgrade the resistance of the devices to higher values. We have found it is desirable to have the peak of the product-resistance distribution below the desired resistance value so that only a small portion or none of the devices fall above the desired value.

The cut wafers are washed with methyl alcohol or some other suitable solvent to remove the jewelers wax, washed with acetone and then methyl alcohol. This step removes the jewelers wax, oil or other impurities which might be present as a result of the diamond sawing.

The wafers are then lapped with a silicon carbide paper. We have found that 180–C silicon carbide paper gives satisfactory results. The lapping is done by hand under a metal weight using strokes in one direction only across the paper. The wafer is then washed and wiped with paper to remove impurities, mainly particulate, which have collected on the silicon as a result of lapping. The wiping with paper seems to be necessary to remove all traces of fine matter. Some of the particles apparently tend to remain even after the water washing.

The next step of the process of preparing p-type thermistors is aluminum deposition. The wafers are prepared for aluminum deposition in any suitable manner. We have found that successive washes with acetone, methanol and water, concentrated HF, water, methanol give satisfactory results. This procedure is used to remove impurities such as grease, oil, oxide film, etc. which might interfere with a good aluminum deposition.

The danger of contamination in any of the steps during the preparation of the material for aluminum deposition is very great. The wafer faces should not be handled between the preparation for aluminum deposition and the nickel plating.

After the wafers are prepared, they are coated with aluminum by vacuum deposition. In this step, a wafer or several wafers are mounted in a vacuum chamber above a densified graphite crucible containing high purity aluminum. The chamber is pumped down until the vacuum is below $8.5\times10^{-5}$ mm. mercury. The aluminum is flashed by means of an R-F heating coil around the graphite crucible. Other standard heating techniques could also be used.

In our particular modification we initially flash the aluminum for a period of 35 seconds. The wafers are cooled for 5 minutes and another 35-second flash made After the wafers have cooled, the chamber is opened and the wafers are reversed so that both sides of the wafer have the aluminum deposited on them. The amount of aluminum to be deposited is not critical. We have found that satisfactory results are otbained when we deposit 0.3 to 0.5 milligrams of aluminum per side of a wafer which is ⅞" to 1" in diameter. This amounts to 0.4 to 0.8 milligrams per square inch of surface. The lower limit of the amount of aluminum to be deposited is about .2 milligrams per square inch, the upper limit about 2 milligrams per square inch.

After the aluminum is deposited on the silicon it is alloyed to the silicon in any suitable manner. We have found that this alloying can be satisfactorily accomplished by heating the aluminum-deposited wafers in a quartz tube furnace under an inert atmosphere. Helium, nitrogen and argon can be used to produce the proper atmosphere. The furnace is heated and the materials are alloyed at a temperature between 580° C. and 630° C. Alloying is normally carried out for about 10 to 30 minutes, preferably for 20 minutes. The critical points in this alloying are the heating to the proper temperature and heating under an inert atmosphere to prevent oxide formation.

The process for preparing n-type thermistors does not include the aluminum coating step.

The next step in both processes is the nickel-plating of the wafers. The wafers are prepared for nickel-plating by etching with a 48% HF solution. The etching removes any oxide which may be formed on the aluminum-silicon surface and also any excess aluminum which may be on the surface.

After this etching, the wafers are wiped with paper to remove any deposits formed in the previous HF treatment. The wafers are then washed with water, concentrated HF and water solution. During washing and HF treatment, the wafers are not exposed to the atmosphere for any lengthy period of time. Such exposure can result in the formation of an oxide film and consequent poor adhesion of the metal plating. The wafers are kept under the solution and transferred quickly from one step to the other.

The wafers are further conditioned for nickel-plating by brief immersion in boiling ammonium hydroxide. This step has been found essential if a good nickel plate on the wafers is to be achieved. The wafers are kept immersed in the boiling ammonium hydroxide until the first signs of reaction are noted visually. They are then transferred to the nickel-plating solution with a minimum of atmospheric exposure.

The wafers are nickel-plated using the electrodeless technique. Any of the conventional electrodeless techniques can be used for this plating. We have found satisfactory results are obtained when the nickel-plating solution is maintained at about 96° C. and has the following formulation:

| | Grams/liter |
|---|---|
| Nickel chloride | 30 |
| Sodium hypophosulfite | 10 |
| Sodium citrate | 65 |
| Ammonium chloride | 50 |

When plating, ammonium hydroxide is added to the solution until the pH is between 7 and 8. This pH is maintained during the plating procedure. The plating normally is completed in less than 5 minutes. Approximately 0.0095 gram of nickel is plated on each wafer using this technique. This is equivalent to 8.5 mg. per square inch. The limits on the amount of nickel are 5 to 25 mg. per square inch.

After the plating step is completed, the wafers are heat treated at 210° C. for up to about 18 hours in argon or nitrogen. This can be accomplished in any standard furnace equipped with an argon or nitrogen supply. It is done to stabilize the resistance of the unit and bring about slight changes which sometimes occur in the beginning of the annealing period.

After the wafers have been annealed, it is preferable to recheck the resistivity of several wafers using the pressure contact technique. The number of wafers to be checked would depend on the amount of resistivity variance which would be expected from the measurements made previously. If the measurements indicate there is a great variance, the checking of every wafer might be recommended. If the measurement indicates very uniform resistivity, this step could be eliminated.

The next step of the operation is dicing the wafers. This is done using the equation set out in the first step. The resistivity and thickness of the device are fixed and only the area is determined. If the device is to be circular, the diameter is chosen to coincide with a dicing tool that is available to yield a device which is on the low side of the desired resistance value.

The dicing can be done using any commercially available equipment. We have found good results are obtained when we use an ultrasonic dicer to prepare circular dice. This is standard equipment in the semi-conductor industry.

If the dice are to be square or rectangular, any suitable method, such as the diamond saw for example, can be used to prepare these devices.

After the wafers have been diced, the leads are soldered to the dice. Any suitable soldering technique can be used. We have found good results are obtained when the leads are soldered with tin at a temperature of 240–250° C. In our preferred technique, the thermistor dice are mounted in a Teflon jig and tinned copper leads are butted against the nickel-plated surface of the thermistor. Obviously, many lead materials could be used. Flux is applied to the plated surface and the jig and thermistor are dipped into a tin pot maintained at a temperature of 240–250° C. The thermistor is held in the tin long enough for the tin to wet the thermistor and the lead. Excessive periods of time in the solder can result in a separated contact. It is, of course, critical that the time be adjusted to avoid this result. Suitable results are obtained when the devices are kept in the solder for less than thirty seconds.

The dice with the leads soldered to them are then washed with methyl alcohol or any other suitable solvent to remove any traces of flux and to clean the surface.

The size of the thermistor is then adjusted using high speed diamond grinding. This adjustment is made by comparing the resistance of the product thermistor to the resistance of a standard thermistor. The thermistors which are below the desired resistance value and need adjustment are mounted on a terminal board near a standard thermistor of the proper resistance. The terminal board is then submerged below the surface of a silicone oil bath. The adjustment is made by comparing the resistance of the thermistor being adjusted to the resistance of a standard thermistor, thus exact temperature control of the oil bath is not necessary. The standard thermistor and the thermistor being adjusted are mounted in opposite ratio arms of a Wheatstone bridge. Silicon is abraded away from the side of the thermistor until the resistance reaches the desired value. Abrasion is accomplished by any suitable means. We have found this abrasion can be carried out conveniently using a diamond bit in a 12,000 r.p.m. dentist-type drill. The operator merely abrades the thermistor until the galvanometer reaches 0, indicating no difference between the standard thermistor and the reference thermistor.

After this step is completed, the final determination of the temperature-resistance behavior is made at a minimum of three temperatures.

For the gold-doped p-type silicon, we have found satisfactory results are obtained if the resistance is checked at three temperatures along a standard curve. These might be 25° C., 0° C. and −60° C. For gold doped n-type silicon these temperatures might be 25° C., 100° C., and 200° C. Thermistors which are on the low resistance side according to this test can be sent for readjustment. These measurements can be made by comparing the resistance of the production thermistor to the resistance of a standard thermistor which has been previously determined.

The final step of our process is to paint or coat the thermistor. The painting is preferably done by hand, in order to get as much paint as possible on the edges of the thermistor. Spraying or dipping usually results in a deficiency of paint near the edges of the thermistor, although a technique might be developed to overcome this problem.

We have found that satisfactory results are obtained by painting the thermistors with a white silicone enamel. The devices could suitably be coated with other materials, such as vulcanized silicone rubber. The purpose of this coating is to apply a film that will withstand extremes of temperature and to insulate the thermistor from moisture, etc. In our preferred technique, we apply two coats of silicone enamel and bake for 1 hour for the first coat and 2 hours for the second coat. This baking is not critical. It is used merely to assure that the coating cures sufficiently.

Our invention is further illustrated by the following specific but non-limiting examples.

EXAMPLE I

A monocrystalline silicon rod was purchased from a commercial supplier. The rod was 3 11/16" in length. Measurements were made 6 mm. from the seed end and at equal intervals along the rod. The diameter and p-type resistivity in ohm cms. were measured.

This data is presented in Table I below.

| Diameter in millimeters: | Resistivity in ohm centimeters |
|---|---|
| 22.4 | 15.6 |
| 22.6 | 15.9 |
| 22.7 | 15.1 |
| 22.5 | 14.1 |
| 22.8 | 25.7 |

The rod and seed were cleaned and etched with a solution of 1 volume of concentrated hydrofluoric acid (49%) and 3 volumes of concentrated nitric acid (70%). They were blown dry with argon. The seed and rod were set up in an argon ambient zone refiner for float zone leveling of gold. The seed used in this case was 22.2 ohm cm. p-type. A total of 0.1515 gram of high purity gold was inserted as the dope between the seed and the rod. The seed, rod and dope were fused together in the first molten zone and the zone was passed through the rod at the rate of 8" per hour. At the end of the pass, the rod was 100% monocrystalline.

Three wafers, 2.2 mm. thick, were cut from the seed end, the center and the chuck end of the zone leveled rod. The wafers were deposited with aluminum and alloyed at 580°–630° C. Nickel-plating was applied over the aluminum. The aluminum and nickel-plating on the edges of the wafers were sanded away to prevent short circuiting. Pressure contacts were made and the wafers immersed in a 25° C. bath and their resistance measured. The resistance was found to be 19.5, 19.3 and 16.7 ohms, respectively.

It was desired to make units of 500 ohms resistance at 25° C. from this material. Using the formulation $$R=\rho\frac{L}{R}$$

it was determined to cut the remaining rod into wafers 2.2 mm. thick. It was calculated that the final dice would be cut square with a diamond saw and measure 3 to 4 mm. on the side.

The rod which had been previously mounted on a ceramic block with jewelers wax was left oriented on the ceramic block and was cut into wafers 2.2 mm. thick. Methyl alcohol was used to separate the jewelers wax from the wafers. The wafers were then washed with acetone and alcohol and were hand lapped in one direction with 180–C silicon carbide paper. They were washed with water and wiped with paper to remove fine particles. Successive washings with acetone, methanol, water, concentrated-hydrofluoric acid, water and methanol then followed. The wafers were then ready for aluminum deposition. The aluminum deposition was made by transferring the wafers to a vacuum chamber above a densified graphite crucible containing high purity aluminum. The chamber was pumped down until the vacuum was below $8.5 \times 10^{-5}$ mm. mercury. The aluminum was flashed by means of an R-F heating coil around the graphite crucible. The initial flash lasted for 35 seconds. The wafers were cooled for five minutes and another 35-second flash was made. After cooling, the chamber was opened and the wafers reversed so that previously unexposed sides were then exposed. The process was then repeated so that both sides of the wafers contained aluminum deposited thereon. The aluminum coating was 8.5 mg. per square inch of surface.

After the aluminum deposition was complete, the wafers were transferred to an alloying furnace. They were alloyed under helium at a temperature of 580–630° C. for 20 minutes. The wafers were allowed to cool in the helium atmosphere. After cooling, the wafers were etched with concentrated (49%) hydrofluoric acid to remove oxide and excess aluminum from the surface. They were then wiped with paper and washed successively with water, concentrated hydrofluoric acid and water. The wafers were immersed in boiling ammonium hydroxide. When the first sign of visible reaction occurred on the surface, the wafers were transferred rapdily to the nickel-plating solution. The wafers were nickel-plated using the electrodeless technique. The nickel-plating solution had the following composition:

| | Grams/liter |
|---|---|
| Nickel chloride | 30 |
| Sodium hypophosphite | 10 |
| Sodium citrate | 65 |
| Ammonium chloride | 50 |

Ammonium hydroxide was added until the solution turned from green to blue indicating a pH of 7 to 8. The pH was maintained at about 7 during the plating procedure which lasted for about 5 minutes. Approximately 0.0095 gram of nickel was plated on each wafer. The plated wafers were heated at 210° C. for about 16 hours in a nitrogen atmosphere. The resistivity of a representative group was measured. Of the 20 wafers cut from the bar, 7 were selected for measurement. These wafers were measured at 25° C. with pressure contacts. The resistance was as follows: 19.5, 20.0, 19.9, 21.7, 19.3, 18.3, 16.5 and 18.6 ohms, respectively. These readings checked very well with the first three trial wafers. The wafer which had a resistance of 16.5 ohms was considered for dicing to prepare thermistors with a resistance of 500 ohms at 25° C. Using the physical dimensions and the equation $$R=\rho\frac{L}{A}$$

the resistivity $\rho$ of the silicon in this wafer was calculated to be 282 ohm cm. Again using the equation and fixing R at 500 ohms, $\rho$ at 282 ohm cm. and L at 0.22 cm., the Area, A, of a 500 ohm device would be 0.1240 cm.$^2$ or a square of 3.5 mm. on a side. Since it was desired to have the final devices fall below 500 ohms, square dice of 3.6 mm. on a side were cut on the diamond saw. These were soldered to the dice using the following techniques:

The thermistor dice were mounted in a Teflon jig and tinned copper leads were butted to the nickel-plated surfaces of the thermistor. Flux was applied to the plated surfaces and the jig and the thermistor were dipped into a tin pot maintained at 240° C. The thermistor was held in the tin just long enough for the tin to wet the thermistor and leads. The thermistors were then washed with methyl alcohol. The size of the thermistors was then adjusted by high speed abrasion using a diamond bit in a 12,000 r.p.m. dentist-type drill. The thermistors were mounted on a terminal board near a standard thermistor of the proper resistance. The terminal board was then submerged below the surface of a silicone oil bath. The standard thermistor and the thermistor being adjusted were mounted on opposite ratio arms of a Wheatstone bridge. Silicon was abraded away from the side of the thermistor until the galvanometer read 0, indicating no difference in the standard thermistor and the resistance thermistor.

Before adjusting, thermistors from the wafer had a resistance of about 470 ohms. The resistance of the thermistors from this wafer were measured at 0, 25 and −58.5° C. to determine the deviation from the standard curve. The results of these measurements are given in Table II below.

*Table II*

| Sample No. | Resistance in ohms at— | | |
|---|---|---|---|
| | 25° C. | 0° C. | −58.5° C. |
| W-15-1 | 500 | 1,592 | 80,330 |
| W-15-2 | 499 | 1,585 | 80,250 |
| W-15-3 | 499 | 1,588 | 80,370 |
| W-15-4 | 500 | 1,595 | 80,750 |
| W-15-5 | 502 | 1,600 | 80,930 |
| W-15-6 | 500 | 1,599 | 80,460 |
| W-15-7 | 500 | 1,597 | 80,648 |
| W-15-8 | 500 | 1,599 | 80,700 |
| W-15-9 | 501 | 1,598 | 80,270 |
| W-15-10 | 500 | 1,593 | 80,770 |
| W-15-11 | 500 | 1,596 | 80,800 |
| W-15-12 | 501 | 1,601 | 80,650 |
| W-15-13 | 500 | 1,596 | 80,300 |
| W-15-14 | 501 | 1,591 | 79,100 |
| W-15-15 | 500 | 1,592 | 80,250 |

The thermistors were then coated with a film of white silicon enamel, baked one hour at 210° C., recoated and baked four hours at 210° C. The thermistors were then finished and ready for use.

EXAMPLE II

A p-type silicon rod which weighed 142 grams and had a lifetime of 100–200 microseconds was selected and prepared for float zone leveling. The resistivity profile of the rod which was 5¼" long was measured 6 mm. from the seed end and successive measurements were made over equally spaced intervals. The data collected is shown in Table III below.

*Table III*

| Diameter in millimeters: | Resistivity in ohm centimeters |
|---|---|
| 24.2 | 59.2 |
| 24.2 | 51.8 |
| 24.2 | 54.0 |
| 24.2 | 57.2 |
| 24.2 | 52.8 |
| 24.0 | 50.4 |
| 24.0 | 48.0 |
| 23.9 | 48.0 |

These measurements were made using the 4-point probe technique. The seed used in this case was 42.0 ohm cm. p-type and the rod was etched in a solution of 1 volume of concentrated hydrofluoric acid (49%) and 3 volumes of concentrated nitric acid (70%). They were blown dry with argon. The seed and the rod were set up in an argon zone refiner for float zone leveling of gold. A total of 0.1508 grams of high purity gold was inserted as the dope between the seed and the rod. The seed, rod and dope were fused together in the first molten zone. The zone was passed through the rod at a rate of 8" per hour. At the end of the pass, the rod was 100% monocrystalline.

Three wafers, 2.3 mm. thick, were cut from the seed end, the center and the chuck end of the zone leveled rod. The wafers were deposited with aluminum and alloyed at 580–630° C. Nickel-plating was applied over the aluminum. The aluminum and nickel plating on the edges of the wafers were sanded away to prevent short circuiting. The wafers were immersed in a 25° C. bath and the resistance measured. The resistance was found to be 66.3, 52.1 and 56.8 ohms, respectively. Using the formula $$R=\rho\frac{L}{A}$$

resistivities of 1192, 1014 and 1130 ohm cms. were calculated for the gold-doped silicon. It was desired to make units of 4000 and 5000 ohms at 25° C. from this material. Using the formula set out above, realizing the existence of ultrasonic tool sizes of 2.5, 3.0 and 3.5 mm. diameter, it was determined to cut one portion of the rod into wafers 1.5 mm. thick and another portion into wafers 2.0 mm. thick.

The cut wafers were cleansed, deposited with aluminum, alloyed and plated with nickel using the techniques described in Example I.

The plated wafers were heated to 210° C. overnight in a nitrogen atmosphere. Sixteen wafers had been cut from the seed end of the crystal. Five were 1.5 mm. thick and 11 were 2.0 mm. thick. All were measured using pressure contacts at 25° C. The readings are set out in the table below.

*Table IV*

| Wafer No. | Mm. | Ohms | Wafer No. | Mm. | Ohms |
|---|---|---|---|---|---|
| 1 | 1.5 | 37.6 | 9 | 2.0 | 40.7 |
| 2 | 1.5 | 33.6 | 10 | 2.0 | 44.6 |
| 3 | 1.5 | 34.5 | 11 | 2.0 | 45.0 |
| 4 | 1.5 | 37.8 | 12 | 2.0 | 37.8 |
| 5 | 1.5 | 38.6 | 13 | 2.0 | 43.6 |
| 6 | 2.0 | 43.8 | 14 | 2.0 | 44.8 |
| 7 | 2.0 | 43.8 | 15 | 2.0 | 36.3 |
| 8 | 2.0 | 44.9 | 16 | 2.0 | 36.1 |

These readings checked with the readings obtained on the three trial wafers after correcting for thickness. Two wafers were selected from this group for ultrasonic dicing. No. 5 was diced into circular dice of 2.5 mm. diameter. No. 8 was also diced to 2.5 mm. diameter. After leads were attached using the techniques described in Example I, thermistors from wafer No. 5 measured about 3300 ohms. Thermistors from wafer No. 8 measured about 4100 ohms. The 3300 ohm thermistors were adjusted, using the technique described in Example I, to 4000 ohms. The 4100 ohm thermistors were then adjusted using the same technique to 5000 ohms. Final temperature-resistance behavior was measured at three temperatures. Thermistors from wafer No. 5 gave the results set out in Table V below.

*Table V*

| Sample No. | Resistance in ohms at— | | | | | |
|---|---|---|---|---|---|---|
| | 25° C. | 0° C. | −58.3° C. | −58.4° C. | −58.5° C. | −58.6° C. |
| W-5-1 | 3,996 | 12,700 | 607,000 | ------ | ------ | ------ |
| W-5-2 | 3,998 | 12,715 | 599,000 | ------ | ------ | ------ |
| W-5-3 | 3,998 | 12,731 | ------ | 620,000 | ------ | ------ |
| W-5-4 | 3,995 | 12,677 | ------ | 614,000 | ------ | ------ |
| W-5-5 | 3,994 | 12,677 | ------ | 615,000 | ------ | ------ |
| W-5-6 | 4,015 | 12,756 | ------ | 621,000 | ------ | ------ |
| W-5-7 | 3,990 | 12,656 | ------ | 611,000 | ------ | ------ |
| W-5-8 | 4,000 | 12,709 | ------ | 617,000 | ------ | ------ |
| W-5-9 | 3,988 | 12,673 | ------ | 617,000 | ------ | ------ |
| W-5-10 | 4,014 | 12,734 | ------ | 618,000 | ------ | ------ |
| W-5-11 | 4,012 | 12,778 | ------ | 619,000 | ------ | ------ |
| W-5-12 | 4,002 | 12,706 | ------ | 618,000 | ------ | ------ |
| W-5-13 | 4,000 | 12,753 | 613,000 | ------ | ------ | ------ |
| W-5-14 | 3,997 | 12,714 | 611,000 | ------ | ------ | ------ |
| W-5-15 | 3,997 | 12,696 | 614,000 | ------ | ------ | ------ |
| W-5-16 | 4,008 | 12,739 | 615,000 | ------ | ------ | ------ |
| W-5-17 | 3,995 | 12,731 | ------ | ------ | 621,000 | ------ |
| W-5-18 | 3,982 | 12,679 | ------ | 614,000 | ------ | ------ |
| W-5-19 | 3,998 | 12,694 | ------ | 614,000 | ------ | ------ |
| W-5-20 | 3,985 | 12,702 | ------ | 614,000 | ------ | ------ |
| W-5-21 | 3,999 | 12,711 | ------ | 616,000 | ------ | ------ |
| W-5-22 | 4,000 | 12,732 | ------ | 619,000 | ------ | ------ |
| W-5-23 | 4,002 | 12,813 | ------ | 629,000 | ------ | ------ |
| W-5-24 | 3,994 | 12,706 | ------ | 617,000 | ------ | ------ |
| W-5-25 | 3,997 | 12,746 | ------ | 615,000 | ------ | ------ |
| W-5-26 | 3,990 | 12,704 | ------ | 617,000 | ------ | ------ |
| W-5-27 | 4,022 | 12,770 | 611,000 | ------ | ------ | ------ |
| W-5-28 | 3,997 | 12,657 | 605,000 | ------ | ------ | ------ |
| W-5-29 | 3,996 | 12,720 | ------ | 615,000 | ------ | ------ |
| W-5-30 | 4,001 | 12,784 | ------ | 624,000 | ------ | ------ |
| W-5-31 | 4,024 | 12,818 | ------ | 623,000 | ------ | ------ |
| W-5-32 | 3,993 | 12,698 | 613,000 | ------ | ------ | ------ |
| W-5-33 | 3,999 | 12,682 | 612,000 | ------ | ------ | ------ |
| W-5-34 | 3,998 | 12,667 | 614,000 | ------ | ------ | ------ |
| W-5-35 | 4,005 | 12,693 | 610,000 | ------ | ------ | ------ |
| W-5-36 | 4,004 | 12,760 | ------ | 624,000 | ------ | ------ |
| W-5-37 | 4,001 | 12,694 | ------ | 614,000 | ------ | ------ |
| W-5-38 | 4,017 | 12,763 | ------ | 612,000 | ------ | ------ |
| W-5-39 | 4,000 | 12,798 | ------ | ------ | ------ | 626,000 |
| W-5-40 | 4,011 | 12,723 | ------ | ------ | ------ | 629,000 |
| W-5-41 | 4,026 | 12,768 | ------ | ------ | ------ | 628,000 |
| W-5-42 | 3,997 | 12,700 | ------ | ------ | ------ | 630,000 |
| W-5-43 | 3,996 | 12,670 | ------ | ------ | ------ | 628,000 |
| W-5-44 | 4,002 | 12,682 | ------ | ------ | ------ | 621,000 |
| W-5-45 | 4,008 | 12,734 | ------ | 617,000 | ------ | ------ |
| W-5-46 | 4,004 | 12,677 | ------ | ------ | ------ | 619,000 |
| W-5-47 | 4,008 | 12,707 | ------ | ------ | ------ | 626,000 |
| W-5-48 | 4,016 | 12,734 | ------ | ------ | ------ | 629,000 |
| W-5-49 | 4,011 | 12,712 | ------ | 617,800 | ------ | ------ |
| W-5-50 | 3,981 | 12,596 | ------ | ------ | ------ | ------ |
| W-5-51 | 3,999 | 12,685 | ------ | 619,000 | ------ | ------ |
| W-5-52 | 4,032 | 12,767 | ------ | 622,000 | ------ | ------ |
| W-5-53 | 4,031 | 12,792 | ------ | 620,000 | ------ | ------ |
| W-5-54 | 4,014 | 12,734 | 604,000 | ------ | ------ | ------ |
| W-5-55 | 4,004 | 12,832 | ------ | 619,000 | ------ | ------ |
| W-5-56 | 3,995 | 12,722 | ------ | 624,000 | ------ | ------ |
| W-5-57 | 4,002 | 12,708 | ------ | ------ | ------ | ------ |

It is apparent from a review of these data that a thermistor device that is highly reproducible, predictable and sensitive, can be prepared using the technique described in these examples.

EXAMPLE III

An n-type monocrystalline rod 5½" long by ⅞" in diameter was prepared for zone leveling. The resistivity profile was measured. The first reading was made 6 mm. from the seed end. The remaining readings were made at equally spaced intervals along the rod. The resistivity profile is set out in Table I below:

*Table I*

| Measurement No.: | n-Type resistivity in ohm cm. |
|---|---|
| 1 | 8.3 |
| 2 | 7.5 |
| 3 | 8.4 |
| 4 | 7.9 |
| 5 | 7.6 |
| 6 | 7.8 |
| 7 | 7.8 |
| 8 | 8.2 |

The seed used was a greater than 640 ohm cm. n-type. The rod and seed were etched in a solution of 1 volume of (49%) hydrofluoric acid to 3 volumes of (70%) nitric acid. The etching was continued until the surface was bright. Excess liquid was removed by blowing with argon and the device was dried under infrared heat. The seed and rod were set up in an argon atmosphere zone refiner for float leveling of gold. A charge of 0.1579 gram of high purity gold was inserted as the dope between the seed and the rod. A total of 0.0247 gram of a silicon phosphorus dope containing 14,000 parts per billion of phosphorus was also inserted in the device. The phosphorus was added to compensate for the loss of phosphorus from the seed end of the rod during the gold doping. The seed, rod and dope were fused together in the first molten zone and the molten zone was passed through the rod at the rate of 8" per hour. At the end of the pass the rod was 100% monocrystalline.

Three wafers, 1.2 cm. thick, were cut from the seed end, the center and the chuck end of the zone leveled rod. They were cleaned, lapped and plated with nickel by the electrodeless technique. The nickel-plating on the edge of the wafer was sanded away to prevent short circuiting. Pressure contacts were made. The wafers were immersed in a 25° C. bath and their resistance measured. The readings were 4864, 4848 and 4882 ohms, respectively.

It was desired to make units with a resistance of 500,000 ohms at 25° C. from this material. Using the equation $$R=\rho\frac{L}{A}$$

it was determined to cut the remaining rod into wafers 1.2 mm. thick. It was assumed that the final dice would be cut square with a diamond saw and measure about 2 mm. on a side.

The rod which had been previously mounted on a ceramic block with jewelers wax was left oriented and a diamond saw was used to cut the rod into wafers 1.2 mm. thick. Methyl alcohol was used to separate the jewelers wax from the wafers. The wafers were then washed with acetone and alcohol. The wafers were hand lapped in one direction with 180–C silicon carbide paper. They were washed with water and wiped with paper to remove fine particles. Successive washings with acetone, methanol, water concentrated HF and water then followed. The wafers were immersed in boiling ammonium hydroxide. When the first signs of visible reaction occurred on the surface, the wafers were transferred rapidly to a nickel-plating solution with a minimum of atmospheric exposure. The wafers were nickel-plated using the electrodeless technique. The nickel-plating solution had the following composition.

| | Grams/liter |
|---|---|
| Nickel chloride | 30 |
| Sodium hypophosphite | 10 |
| Sodium citrate | 65 |
| Ammonium chloride | 50 |

Ammonium hydroxide was added until the solution turned from green to blue indicating a pH of 7 to 8. The pH was maintained at about 7 during the plating procedure which lasted about 5 minutes. Approximately 0.0095 gram of nickel was plated on each wafer. The plated wafers were heated at 210° C. overnight in a nitrogen atmosphere. Of the wafer which had been cut from the bar, six wafers from the different space intervals were measured at 25° C. using pressure contacts. The resistance of these wafers measured 4855, 4889, 4916, 4920, 4994 and 4873 ohms, respectively. These readings were checked with the readings on the first trial wafers. Wafers 1 and 2, which measured at 4864 and 4848 ohms were considered for dicing to prepare thermistors with 500,000 ohms resistance at 25° C. Using the physical dimensions and the equation $$R=\rho\frac{L}{A}$$

the resistivity $\rho$ of the silicon in the wafer was calculated to be 150,000 ohm cms. Again, using the equation and fixing R at 500,000 ohms, $\rho$ at 150,000 ohm cms. and L at 1.2 mm., the area A of a 500,000 ohm device would be 0.040 cm.$^2$ or a square 2 mm. on the side. Since it was desired to have the final devices fall below 500,000 ohms, square dice of 2.1 mm. on a side were cut on the diamond saw. Leads were soldered to the dice using the following technique:

The thermistor dice were mounted on a Teflon jig and tinned copper leads were butted against the nickel-plated surface of the thermistor. Flux was applied to the plated surfaces and jig and thermistor were dipped into a tin pot maintained at 245° C. The thermistor was held in the tin just long enough for the tin to wet the thermistor and leads. The thermistors were then washed with methyl alcohol.

The size of the thermistors was then adjusted by high speed abrasion using a diamond bit in a 12,000 r.p.m. dentist-type drill. The thermistors were mounted on a terminal board near a standard thermistor of the proper resistance. The terminal board was then submerged below the surface of a silicone oil bath. The standard thermistor and the thermistor being adjusted were amounted on opposite ratio arms of a Wheatstone bridge. Silicon was abraded away from the sides of the thermistor until the galvanometer read 0. The size of the thermistors was adjusted as described thus upgrading the resistance to 500,000 ohms at 25° C. Before adjusting, the thermistors measured about 480,000 ohms. The resistance of typical thermistors from the wafers were measured at 25, 60, 100 and 200° C. to determine the fit to a standard curve. The results of these measurements are given in Table II following:

*Table II*

| Thermistor No. | Resistance in Ohms at— | | | |
|---|---|---|---|---|
| | 25° C. | 59.7° C. | 100.1° C. | 200.2° C. |
| 1 | 500,000 | 59,810 | 8,229 | 278 |
| 2 | 498,300 | 59,740 | 8,229 | 279 |
| 3 | 499,400 | 59,440 | 8,243 | 284 |
| 4 | 504,000 | 59,400 | 8,236 | 279 |
| 5 | 503,000 | 59,800 | 8,238 | 278 |
| 6 | 500,000 | 59,870 | 8,268 | 285 |
| 7 | 503,000 | 59,430 | 8,258 | 285 |
| 8 | 503,000 | 59,620 | 8,245 | 281 |

The thermistors were then coated with a film of white silicone enamel, baked 1 hour at 210 ° C., recoated and baked 4 hours at 210° C. The thermistors are then finished and ready for use.

EXAMPLE IV

An n-type silicon rod 5" long and 15/16" in diameter was prepared for float zone leveling. The resistivity profile was measured. The first reading was made 6 mm. from the seed end. The remaining readings were made at equally spaced intervals along the rod. This data is presented in Table III below.

*Table III*

| Measurement No.: | n-Type resistivity in ohm cms. |
|---|---|
| 1 | 4.2 |
| 2 | 4.2 |
| 3 | 4.1 |
| 4 | 4.8 |
| 5 | 5.1 |
| 6 | 5.5 |
| 7 | 5.6 |
| 8 | 7.0 |

The seed was a 10.1 ohm cm. n-type. The seed and the rod were etched in a solution of 1 part HF, 3 parts $HNO_3$ to a bright finish and blown dry with argon gas. The seed and rod were set up in an argon ambient zone refiner for float zone leveling of gold. A charge of 0.1505 gram of high purity gold was inserted as the dope between the said and the rod, along with 0.0200 gram of silicon phosphorus dope containing 14,000 parts per billion of phosphorus. The phosphorus dope was added to compensate for the loss of phosphorus from the seed end of the rod during the gold doping. The seed, rod and dope were fused together in the first molten zone and the zone was passed through the rod at the rate of 8" per hour. At the end of the pass, the rod was 100% monocrystalline.

Three wafers, 1.2 mm. thick, were cut from the seed end, the center and the chuck end of the zone leveled rod. They were cleansed, lapped and plated with nickel by the electrodeless technique. The nickel-plating on the edges of the wafers was sanded away to prevent short circuiting. The wafers were immersed in a 25° C. bath. Their resistance was 1500, 1533, and 1538 ohms, respectively. Using the formula $$R=\rho\frac{L}{A}$$

resistivities of 54,500, 55,700 and 55,800 ohm cm. were calculated for the gold doped silicon. It was desired to make units of 150,000 ohms at 25° C. from this material. Again, using the equation $$R=\rho\frac{L}{A}$$

it was determined to cut the rod into wafers 1.2 mm. in thickness. It was assumed that the final dice would be cut square and measure about 2 mm. on a side.

The rod which had been previously mounted on a ceramic block with jeweler's wax was then cut into wafers 1.2 mm. thick. The preparation for nickel-plating and the nickel-plating were carried out using the techniques described in Example I. The plated wafers were annealed at 210 ° C. overnight in a nitrogen atmosphere. The first two trial wafers from the seed end and the center were cut into square dice 2.1 mm. on the side. Leads were soldered to the dice with tin, as described in Example I. Washing with methanol followed the soldering step. The size of the thermistors was adjusted, as described in Example I, upgrading the thermistors to 150,000 ohms at 25° C. Before adjusting, the thermistors measured about 140,000 ohms. The resistance of the thermistors from the wafers were measured at 25, 60, 100 and 200° C. to determine their fit to a standard curve. Typical results are given in Table IV below:

*Table IV*

| Thermistor No. | Resistance in Ohms at— | | | |
|---|---|---|---|---|
| | 25° C. | 59.7° C. | 100.1° C. | 200.2° C. |
| 1 | 150,000 | 20,391 | 2,959 | 142 |
| 2 | 150,600 | 20,630 | 2,969 | 140 |

It is apparent from the data presented in Examples I and II that a thermistor with excellent sensitivity and reproducibility characteristics can be prepared using the techniques of our novel process.

Obviously, many modifications and variations of the invention as hereinabove set forth may be applied without department from the essence and scope thereof, and only such limitations should be applied as indicated in the appended claims.

This application is a continuation of co-pending applications, Serial Nos. 244,805 and 244,806, filed December 14, 1962, now abandoned.

What is claimed is:

1. A process for preparing a highly sensitive thermistor device capable of exhibiting a large change in conductivity with small changes in temperature from monocrystalline high impurity n-type silicon which comprises the steps of impregnating a rod of the n-type silicon with about 1 to 100 parts per billion of gold by the zone leveling technique, calculating the thickness of the thermistor devices based on the measured resistivity of wafers removed from the rod, nickel-plating the wafers, dicing the wafers, soldering leads to the dice, adjusting the size of the dice to prepare thermistorss with a predetermined resistivity, coating the dice with a paint resistant to change in temperature and recovering the thermistor devices.

2. A process for preparing a highly sensitive thermistor device capable of exhibiting a large change in conductivity with small changes in temperature from monocrystalline silicon which comprises the steps of impregnating a rod of monocrystalline n-type silicon containing less than 100 parts per billion of impurities with 10 to 100 parts per billion of gold using the zone leveling technique, measuring the resistivity of selected wafers cut from the rod, calculating the thickness of the thermistor devices from the measured resistivity, cutting the balance of the rod into wafers, nickel-plating the wafers, dicing the wafers, soldering leads to the individual dice, adjusting the size of the dice to prepare thermistors with the desired resistivity, coating the dice with a paint resistant to temperature changes and recovering the thermistor devices.

3. A process for preparing a thermistor device capable of exhibiting a large change in conductivity with small changes in temperature by impregnating a rod of monocrystalline n-type silicon containing up to 10 parts per billion of impurities with about 4 to 20 parts per billion of gold by the zone leveling technique, measuring the resistivity of wafers selectively cut from the rod, calculating the thicknesss of the thermistors from the measured resistivity, cutting the balance of the rod into wafers of predetermined thickness, immersing the wafers in a bath of ammonium hydroxide followed by immersion in a nickel-plating bath, dicing the nickel-plated wafers, soldering leads on the dice, adjusting the size of the dice to prepare thermistors with the desired resistivity profile, coating the thermistors with a paint resistant to changes in temperature and recovering the product thermistors.

4. A process for preparing a thermistor device capable of large changes in resistivity with small changes in temperature by impregnating a rod of monocrystalline n-type silicon containing up to 10 parts per billion of impurities with about 4 to 20 parts per billion of gold by the zone leveling technique, selectively cutting wafers from the rod, measuring the resistivity of the wafers and calculating the thickness of the final devices on the basis of these measurements, cutting the balance of the rod into wafers of predetermined thickness, etching the wafers, cleaning the wafers to remove the etching solution, immersing the wafers in a bath of ammonium hydroxide followed by immersion in a nickel-plating solution maintained at about 96° C., cutting the wafers into dice, soldering leads on the dice with molten tin, adjusting the size of the dice to prepare thermistors with the desired resistivity profile, coating the thermistors with a paint resistant to temperature changes and recovering the product thermistor.

5. A process for preparing a very sensitive thermistor device capable of exhibiting large changes in resistivity with small changes in temperature by impregnating a rod of monocrystalline n-type silicon containing up to 10 parts per billion of impurities with 4 to 20 parts per billion of gold by the zone leveling technique, selectively cutting wafers from the rod, measuring the resistivity of said wafers and calculating the thickness of the final thermistor devices on the basis of these measurements, cutting the balance of the rod into wafers of predetermined thickness, etching the wafers, cleaning the wafers to remove the etching solution, immersing the cleaned wafers in a bath of boiling ammonium hydroxide for up to 30 seconds, followed by immersion in a nickel-plating bath containing nickel chloride, sodium hypophosphite, sodium citrate and ammonium chloride, removing the nickel-plated wafers, dicing the wafers, soldering leads on the dice by immersion in a bath of tin heated to about 240° C., cleaning the dice, adjusting the size of the dice to prepare thermistors with the desired resistivity profile, coating the thermistors with a silicone enamel and recovering the product thermistors.

6. A process for preparing a thermistor device capable of exhibiting a high change in conductivity with small change in temperature from monocrystalline high purity p-type silicon which comprises the steps of impregnating a rod of the silicon with 1 to 1500 parts per billion of gold by the zone leveling technique, calculating the thickness of the thermistor devices based on measured resistivity of wafers removed from the rod, coating the wafers with aluminum, alloying the aluminum with the silicon, nickel-plating the wafers, dicing the wafers, soldering leads on the dice, adjusting the size of the dice to prepare thermistors with a predetermined resistivity, coating the dice with a paint resistant to change in temperature and recovering the thermistor devices.

7. A process for preparing a thermistor device capable of exhibiting a high change in conductivity with small changes in temperature from monocrystalline p-type silicon which comprises the steps of impregnating a rod of the p-type monocrystalline silicon with 1 to 1000 parts per billion of gold using the zone leveling technique, measuring the resistivity of selected wafers cut from the rod, and calculating the thickness of the thermistor devices from the measured resistivity, cutting the balance of the rod into wafers, vacuum depositing aluminum on the wafers, heating the aluminum-coated wafers to alloy the aluminum with the silicon, nickel-plating the wafers, dicing the wafers, soldering leads on the individual dice, adjusting the size of the dice to prepare thermistors with the desired resistivity, coating the dice with a paint resistant to temperature changes and recovering the finished thermistor device.

8. A process for preparing a thermistor device capable of exhibiting a large change in conductivity with small changes in temperature from a rod of monocrystalline p-type silicon which comprises the steps of impregnating the rod of silicon with 50 to 1000 parts per billion of gold by the zone leveling technique, measuring the resistivity of wafers selectively cut from the rod, and calculating the thickness of the thermistors from the measured resistivity, cutting the balance of the rod into wafers of the predetermined thickness, vacuum depositing aluminum on the wafers, heating the coated wafers to about 580 to 630° C. to alloy the aluminum with the silicon, etching and cleaning the wafers, immersing the wafers in a bath of ammonium hydroxide, followed by immersion in a nickel-plating bath, dicing the nickel-plated wafers, soldering leads on the dice, adjusting the size of the dice to prepare thermistors with the desired resistivity profile, coating the thermistors with a paint resistant to changes in temperature and recovering the product thermistors.

9. A process for preparing a thermistor device capable of exhibiting large ranges in resistivity with small changes in temperature from a rod of monocrystalline p-type silicon which comprises the steps of impregnating the rod with 50 to 1000 parts per billion of gold by the zone leveling technique, selectively cutting wafers from the rod, measuring the resistivity of the wafers and calculating the thickness of the final devices on the basis of these measurements, cutting the balance of the rod into wafers of the predetermined thickness, vacuuum depositing aluminum on the wafers in an amount equal to 0.2 to 2 milligrams of aluminum per square inch of surface, heating the coated wafers to a temperature of about 580 to 630° C. for about 10 to 30 minutes to alloy the aluminum on the silicon, etching the wafers, cleaning the wafers to remove the etching solution, immersing the cleaned wafers in a bath of ammonium hydroxide followed by immersion in a nickel-plating solution maintained at about 96° C., cutting the wafers into dice, soldering leads on the dice with molten tin, adjusting the size of the dice to prepare thermistors with the desired resistivity profile, coating the thermistors with a paint resistant to temperature changes and recovering the product thermistor.

10. A process for preparing a thermistor device capable of exhibiting large changes in resistivity with small changes in temperature from a rod of monocrystalline p-type silicon which comprises the steps of impregnating the rod with 50 to 1000 parts per billion of gold by the zone leveling technique, selectively cutting wafers from the rod, measuring the resistivity of said wafers and calculating the thickness of the final thermistor devices on the basis of these measurements, cutting the balance of the rod into wafers of predetermined thickness, vacuum depositing aluminum on the wafers in an amount equal to 0.4 to 0.8 milligrams of aluminum per square inch of surface, heating the coated wafers to a temperature of 580 to 630° C. in an inert atmosphere for about 10 to 20 minutes to alloy the aluminum and the silicon, etching the wafers, cleaning wafers to remove the etching solution, immersing the clean wafers in a bath of boiling ammonium hydroxide for about 20 seconds, followed by immersion in a nickel-plating bath containing nickel chloride, sodium hypophosphite, sodium citrate and ammonium chloride, removing the nickel-plated wafers, dicing the wafers, soldering leads on the dice by immersion in a bath of tin heated to about 240° C., cleaning the dice, adjusting the size of the dice to prepare thermistors with the desired resistivity profile, coating the thermistors with a silicone enamel and recovering the product thermistors.

No references cited.